Sept. 28, 1948.  E. H. PARNELL, SR  2,450,253
FISHING LURE
Filed March 21, 1945
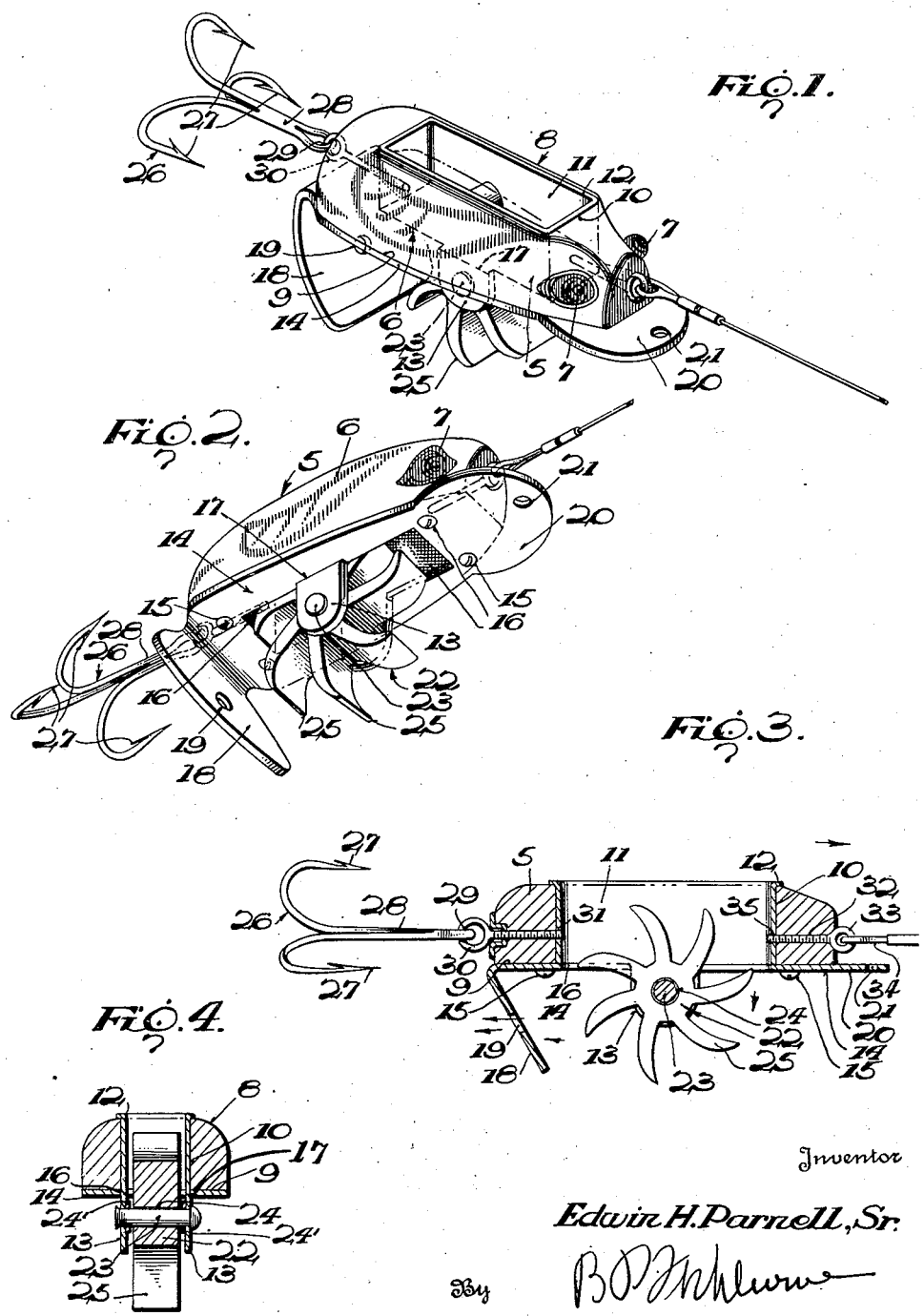
Inventor
Edwin H. Parnell, Sr.
By
Attorney Patented Sept. 28, 1948

2,450,253

UNITED STATES PATENT OFFICE 2,450,253

FISHING LURE

Edwin H. Parnell, Sr., Greenville, S. C.

Application March 21, 1945, Serial No. 583,894

7 Claims. (Cl. 43—42)

My invention relates to artificial fishing baits or lures.

An important object of the invention is to provide a lure having a rotary turbine or spinner which will simulate the movable parts of a live bait when trolled in the water.

A further object of the invention is to provide a lure so constructed that the turbine or spinner is visible from the top and bottom, thus increasing the attractiveness of the lure to the fish.

A further object of the invention is to provide a lure of the above mentioned character which will maintain an upright position during trolling and will not turn upon its longitudinal axis and twist the line.

A further object of the invention is to provide a lure of the above mentioned character having a hook unit attached to its rear end so that the hook unit is readily taken by the game fish pursuing the lure.

A further object of the invention is to provide a runner plate arranged beneath the body portion of the lure and attached thereto and serving to strengthen the lure and guide the same in its travel when trolling.

A further object of the invention is to provide a vane arranged to aid in retaining the lure in the upright position during trolling.

A further object of the invention is to provide means for creating a rapid stream or jet of water adjacent to the hook unit for vibrating the same, simulating the movement of the tail or fin of a live bait.

A further object of the invention is to provide a lure of the above mentioned character which will produce a fluttering or dingling noise during trolling.

A further object of the invention is to provide means whereby the line may be attached to the runner plate for producing a medium undersurface straight swim, or fastened to the nose or forward end of the body portion for producing a deeper swim in short dives or jumps.

A further object of the invention is to provide a means to cause the body portion to jerk forwardly when struck by the game fish, causing the hook unit to be firmly embedded in the mouth of the fish.

Other objects and advantages of the invention will be apparent during the course of the following description.

In the accompanying drawing forming a part of this application, and in which like numerals are employed to designate like parts throughout the same, Figure 1 is a top perspective view of the fishing lure embodying my invention, Figure 2 is a bottom perspective view of the same, Figure 3 is a central vertical longitudinal section, parts shown in elevation through the device, and Figure 4 is a transverse vertical section through the axis of the turbine or spinner.

In the drawings, wherein for the purpose of illustration is shown a preferred embodiment of my invention, the numeral 5 designates the body portion of the lure, which may be shaped to simulate live bait, such as a frog, bug, small fish or minnow. In the present embodiment, the body portion 5 is shaped to simulate the body of a frog and may be painted black, with red markings 6, and provided with eyes 7. The body portion 5 may be formed of wood, "Bakelite" or any other suitable material. The body portion 5 is elongated, and is tapered longitudinally in a forward direction and is tapered upwardly in a curved manner, as shown at 8, and has a flat lower face 9. The body portion is provided with an elongated vertical opening 10, extending longitudinally thereof, and passing through its top and bottom. Arranged within the elongated vertical opening 10 is an elongated longitudinal housing 11, open at its top and bottom, and preferably having a press fit within the elongated vertical opening 10. This housing may have an outwardly bent flange 12 at its top, while its bottom end is flush with the bottom face 9. At its bottom, the housing 11 has depending knuckles or lugs 13, which extend below the bottom face 9 for a substantial distance, as shown. The knuckles 13 are preferably integral with the housing. The housing and knuckles are preferably formed of a light metal which will not corrode, such as aluminum or any suitable metal alloy.

Arranged beneath the body portion 5 and in contact with the bottom face 9 is a runner plate 14, preferably formed of a metal or alloy which will not corrode. This runner plate extends throughout the entire length of the body portion 5 and is attached thereto by any suitable means, such as screws 15. The runner plate 14 conforms to the shape or curvature of the body portion 5 and its marginal edges extend to the outer edges of the face 9. The runner plate 14 has an elongated rectangular opening 16, in registration with the bore or opening of the housing 11. The marginal edge of the opening 16 projects inwardly beyond the elongated vertical opening 10 of the body portion 5 and the runner-plate is arranged beneath the bottom of the housing 11 and overlaps the same. The marginal edge of the opening 16 is provided with notches 17, receiving the knuckles 13 therein, whereby the runner plate 14 is locked to the knuckles 13 and housing 11 with respect to longitudinal pull. At its rear end, adjacent to the tail end of the body portion 5, the runner plate 14 is extended and bent downwardly to provide a depending forwardly inclined stabilizing vane 18. This vane is sufficiently stiff so that it will maintain its relative inclined position during trolling, but is somewhat resilient so that it will yield forwardly slightly when struck by a game fish, for a purpose to be described. The stabilizing vane is provided centrally thereof with a small opening 19 for producing a rapidly moving agitating current or jet of water, discharging rearwardly in a direction longitudinally of the body portion 5, during trolling, for a purpose to be described.

At its forward end, the runner plate 14 embodies a rounded extension 20, projecting beyond the forward end or nose of the body portion 5, and having an aperture 21 for attachment to the line.

Arranged between the depending knuckles 13 is a rotary turbine or spinner 22, loosely rotatable, mounted upon a transverse shaft 23, passing through the opening 24 of the turbine or spinner. This opening is preferably somewhat larger in diameter than the shaft 23 so that a loose fit is provided which will produce a fluttering or dingling noise during trolling. The shaft 23 extends through apertures formed in the knuckles 13 and is securely attached to these knuckles. Washers 24' are arranged between the turbine or spinner 22 and the knuckles to hold the turbine or spinner permanently spaced from the housing 11 and knuckles 13, so that the turbine is at all times free to rotate. There is a slight clearance between the washers 24' and the ends of the turbine or wheel 22, to promote the loose fitting of the turbine or spinner upon the shaft 23. The turbine or spinner 22 is provided with a plurality of generally radial blades 25, which are equidistantly spaced, transversely flat and longitudinally curved in a forwardly direction opposite to the direction of rotation of the turbine or spinner. Particular attention is called to the fact that the shaft 23 is arranged at an elevation considerably below the bottom face 9 and runner plate 14, whereby the turbine or spinner 22 is held at this lowered elevation with respect to the body portion 5.

Arranged at the rear of the body portion 5 is a hook unit 26, shown as embodying three hooks 27, although this number may be increased or decreased. The hooks are preferably equidistantly spaced and are arranged in a balanced group and their pointed ends face forwardly. The hook unit 26 has a shank 28 having a loose universal connection 29 with a screw 30. This screw extends longitudinally into the body portion 5 and has screw threaded engagement therewith and also has screw threaded engagement in an opening 31 formed in the end of the housing 11. The screw is therefore securely attached to the body portion 5 and to the housing 11. The hook unit 26 is arranged near and above the opening or aperture 19, as shown.

At its forward end or nose, the body portion has a screw 32 provided with an eye 33 for attachment with a line 34. The screw 32 has screw threaded engagement within an opening formed in the body portion 5 and also has screw threaded engagement within an opening 35 formed in the end of the housing 11.

The operation of the lure is as follows:

During trolling, the turbine or spinner 23 rapidly rotates, producing a fluttering or dingling noise and also producing movements simulating the movement of parts of a live bait, such as the legs of a frog or the fins of a fish. The turbine or spinner also produces agitation in the water which is present to a considerable extent in the housing 11, the water being free to pass through the top and bottom of this housing. The rotating turbine or spinner is visible from beneath the lure and from above the lure, as the top of the housing 11 is open. During trolling, the hook unit 26 is pulled by the body portion 5 and is maintained in a generally horizontal position, but constantly vibrating or oscillating, due to the agitation of the reduced rapid stream or jet of water passing through the aperture 19, which stream is in close proximity to the hook unit 26. This hook unit therefore partakes of movements simulating the tail of a fish or the like. When a game fish starts after the bait, it is moving toward the rear end of the bait and since the hook unit 26 is at the rear end of the lure, the fish will first swallow the hook and when striking the lure, its mouth will impinge against the stabilizing vane 18. This stabilizing vane is somewhat resilient and will be flexed at the instant of contact, which will cause the body portion 5 to jerk forwardly, thereby insuring that the hooks 27 will become embedded in the mouth of the fish. Since the axis of rotation of the turbine or spinner 22 is at an elevation well below the body portion 5, this turbine or spinner, when acting against the water and rotating during trolling, produces a downward pull upon the body portion 5, and this pull has a proper leverage through the depending knuckles 13, whereby the lure is maintained in the upright position. The curvature of the blades 25 also increases the grip of the turbine with the water, increasing the downward pull of the turbine. The stabilizing vane 18 also aids in retaining the lure in the upright position, and produces agitation of the water and aids in producing the fluttering noise. When the line 24 is attached to the screw 32, the lure goes deeper and swims in short dives or jerks, and when the line is connected in the aperture 21 of the extension 20, the lure has a medium undersurface straight swim.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, what I claim is:

1. A fishing lure comprising a body portion having a main opening, a transverse shaft, means for supporting the transverse shaft and attached to the body portion and projecting below the body portion, a turbine rotatably mounted upon the transverse shaft and including blades which are longitudinally curved in a forward direction, the upper portion of the turbine extending into the main opening, the turbine and attaching means exerting a downward pull upon the body portion for maintaining the same upright, a forwardly inclined depending resilient stabilizing vane arranged at the rear of the turbine and attached to the body portion, a hook attached to the body portion, and line attaching means secured to the body portion near its forward end.

2. A fishing lure comprising a body portion having a main opening, lugs secured to the body portion adjacent to the main opening and depending below the body portion, a transverse shaft carried by the lugs and arranged at an elevation considerably below the body portion, a turbine rotatable upon the transverse shaft and including blades which are longitudinally curved in a forward direction, the upper portion of the turbine projecting into the main opening, the turbine and lugs exerting a down pull upon the body portion for maintaining the same upright, a forwardly inclined stabilizing vane arranged at the rear of the turbine and attached to the body portion, a hook connected with the body portion near its rear end, and line attaching means connected with the body portion near its forward end.

3. A fishing lure comprising a body portion having a main opening, a rotary turbine projecting into the opening means to mount the turbine upon the body portion, a forwardly inclined transverse stabilizing vane secured to the body portion and depending below the same at the rear of the turbine, a hook attached to the body portion at the rear of the stabilizing vane, and line attaching means carried by the body portion near its forward end.

4. A fishing lure comprising a body portion, a runner plate disposed beneath the body portion and extending throughout substantially the entire length of the body portion and attached thereto, a rotary turbine mounted upon the body portion and operating adjacent to the runner plate, a depending forwardly inclined stabilizing vane arranged adjacent to the rear end of the body portion, hook means carried by the body portion, and line attaching means secured to the body portion near its forward end.

5. A fishing lure comprising a body portion having a main opening, a housing mounted within the main opening and having depending lugs projecting below the body portion, a runner plate arranged beneath the body portion and extending substantially throughout the entire length of the body portion and attached to the body portion, said runner plate having interlocking engagement with the lugs, the rear end of the runner plate being bent downwardly for providing a depending stabilizing vane arranged adjacent to the rear end of the body portion, the stabilizing vane being resilient, a shaft carried by the lugs and arranged at an elevation below the runner plate, a rotary turbine mounted upon the shaft and including blades which are longitudinally curved in a forward direction, the upper portion of the turbine projecting into the housing, an attaching element secured to the rear end of the body portion and to the rear end of the housing, hook means at the rear of the body portion and secured to the attaching element, and a line attaching element carried by the forward end of the body portion and secured to the forward end of the housing, the forward end of the runner plate having means for attachment with a line.

6. A fishing lure comprising a body portion, a flat runner plate arranged beneath the body portion and extending throughout substantially the entire length, a rotary turbine carried by the body portion and operating near the runner plate, a depending stabilizing vane adjacent to the rear end of the body portion and attached to the runner plate, the forward end of the runner plate having a line attaching means, a hook device connected with the rear end of the body portion, and a line attaching element secured to the forward end of the body portion and arranged at an elevation above the runner plate.

7. A fishing lure comprising a body portion having a main opening, a runner plate secured to the bottom of the body portion and extending throughout substantially its entire length, said runner plate being provided at its forward end with a line attaching means and having its rear end bent to provide an inclined stabilizing vane, the runner plate having a main opening, a housing within the main opening of the body portion and having side apertures, a transverse shaft held within the side apertures, a turbine loosely rotatably mounted upon the shaft, spacing washers carried by the shaft upon opposite ends of the turbine, and hook means carried by the body portion.

EDWIN H. PARNELL, Sr.

REFERENCES CITED

The following references are of record in the file of this patent:

UNITED STATES PATENTS

| Number | Name | Date |
| --- | --- | --- |
| 1,239,956 | Phinney | Sept. 11, 1917 |
| 1,803,056 | Davis | Apr. 28, 1931 |
| 1,946,641 | Sisco | Feb. 13, 1934 |
| 2,176,250 | De Long | Oct. 17, 1939 |
| 2,341,234 | O'Byrne | Feb. 8, 1944 |
| 2,347,609 | Phillips | Apr. 25, 1944 |